United States Patent
Chen et al.

(10) Patent No.: US 9,883,534 B2
(45) Date of Patent: Jan. 30, 2018

(54) RANDOM ACCESS METHOD AND APPARATUS BASED ON MULTIPLE UPLINK TIMING ADVANCES

(75) Inventors: Li Chen, Beijing (CN); Fangli Xu, Beijing (CN); Yali Zhao, Beijing (CN); Jiamin Liu, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 15 days.

(21) Appl. No.: 14/008,482

(22) PCT Filed: Feb. 17, 2012

(86) PCT No.: PCT/CN2012/071284
§ 371 (c)(1),
(2), (4) Date: Oct. 22, 2013

(87) PCT Pub. No.: WO2012/129998
PCT Pub. Date: Oct. 4, 2012

(65) Prior Publication Data
US 2014/0044074 A1 Feb. 13, 2014

(30) Foreign Application Priority Data
Mar. 31, 2011 (CN) .......................... 2011 1 0080297

(51) Int. Cl.
*H04W 4/00* (2009.01)
*H04W 74/08* (2009.01)
*H04W 56/00* (2009.01)

(52) U.S. Cl.
CPC ... *H04W 74/0833* (2013.01); *H04W 56/0045* (2013.01)

(58) Field of Classification Search
CPC .............. H04W 74/006; H04W 72/02; H04W 72/0453; H04W 72/0406
See application file for complete search history.

(56) References Cited

U.S. PATENT DOCUMENTS

| 8,934,459 B2* | 1/2015 | Marinier | ................. H04L 5/001 370/336 |
| 2011/0200032 A1* | 8/2011 | Lindstrom | ........ H04W 56/0045 370/350 |

(Continued)

FOREIGN PATENT DOCUMENTS

| CA | 2789637 A1 * | 8/2011 | ............ H04W 74/08 |
| CN | 101646234 A | 2/2010 | |

(Continued)

OTHER PUBLICATIONS

Ericsson, ST Ericsson (Multiple Timing Advance for Carrier Aggregation, 3GPP TSG-RAN WG2 #69, Tdoc R2-101196, Feb. 22-26, 2010).*

(Continued)

*Primary Examiner* — Yemane Mesfin
*Assistant Examiner* — Abdelillah Elmejjarmi
(74) *Attorney, Agent, or Firm* — Marshall, Gerstein & Borun LLP

(57) ABSTRACT

Disclosed are a random access method and apparatus based on multiple uplink timing advances. The method includes: when acquiring that a user equipment has multiple uplink timing advances, initiating, by a network side, for the user equipment a random access on a designated carrier of a secondary cell. According to the examples, random access in the SCell can be realized in scenarios that multi-TA is maintained.

11 Claims, 4 Drawing Sheets

(56) References Cited

U.S. PATENT DOCUMENTS

| | | | | |
|---|---|---|---|---|
| 2011/0243111 A1* | 10/2011 | Andgart | ............ | H04W 56/0045 370/338 |
| 2012/0002555 A1* | 1/2012 | Ohuchi | ................ | H04W 24/08 370/244 |
| 2012/0008600 A1* | 1/2012 | Marinier | ................ | H04L 5/001 370/336 |

FOREIGN PATENT DOCUMENTS

| | | | | |
|---|---|---|---|---|
| CN | 101841907 A | 9/2010 | | |
| CN | 101873707 A | 10/2010 | | |
| CN | 101883398 A | 11/2010 | | |
| CN | 102123516 A | 7/2011 | | |
| EP | 2472965 A1 * | 7/2012 | ............ | H04W 56/00 |
| EP | 2536235 A1 * | 12/2012 | ............ | H04W 74/04 |
| EP | 2675237 A1 * | 12/2013 | ............ | H04W 74/04 |
| WO | WO-2010064858 A2 | 6/2010 | | |
| WO | WO2010103895 A1 * | 9/2010 | ............ | H04W 74/08 |
| WO | WO-2010105472 A1 | 9/2010 | | |
| WO | WO-2011000251 A1 | 1/2011 | | |
| WO | WO-2011018039 A1 | 2/2011 | | |
| WO | WO-2011026377 A1 | 3/2011 | | |
| WO | WO2012027887 A1 * | 8/2012 | ............ | H04W 74/08 |

OTHER PUBLICATIONS

3GPP TSG RAN WG2 Meeting #68 (R2-096506, Nov. 2009).*
3GPP TSG-RAN WG2 Meeting #70 (R2-103083, May 2010).*
Fujitsu, "CIF inclusion in PDCCH order," 3GPP TSG-RAN WG2 Meeting #70bis (2010).
International Search Report for PCT/CN2012/071284 dated May 24, 2012.
European Search Report from Application No. 12765249.3 dated Mar. 16, 2015.
Consideration on RACH procedure and RLF, CATT Discussion, 3GPP TSG RAN WG2 Meeting #68, Nov. 2009.
PDCCH order and RA selection, Discussion and Decision, 3GPP TSG-RAN WG2 Meeting #70, May 2010.
RACH and carrier aggregation, Discussion and Decision, 3GPP TSG-RAN WG2 Meeting #68, Nov. 2009.
Supporting multiple timing advance groups, Discussion and Decision, 3GPP TSG-RAN WG2 meeting #68bis, Jan. 2010.
Office Action from Chinese Application No. 201110080297.3 dated Jan. 14, 2013.
CIF Inclusion in CDI formal 1A for random access procedure initiation, Discussion and decision, 3GPP TSG-RAN1 #62, Aug. 2010.
Discussion on Cell Management, Discussion and decision, 3GPP TSG-RAN Meeting #70bis, Jun./Jul. 2010.

* cited by examiner though they appear as US 9,883,534 B2

RANDOM ACCESS METHOD AND APPARATUS BASED ON MULTIPLE UPLINK TIMING ADVANCES

This application claims the benefit and priority of Chinese patent application No. 201110080297.3, entitled "random access method and apparatus based on multiple uplink timing advances" filed on Mar. 31, 2011. The entire disclosure of the above application is incorporated herein by reference.

FIELD OF THE INVENTION

The present invention relates to communications techniques, and more particularly, to a random access method and apparatus based on multiple uplink timing advances.

BACKGROUND OF THE INVENTION

1. Carrier Aggregation Technique

Peak rate of Long Term Evolution Advanced (LTE-A) has been dramatically increased with respect to that of Long Term Evolution (LTE). In LTE-A, a downlink rate of 1 Gbps and an uplink rate of 500 Mbps are required. At the same time, LTE-A systems are required to be compatible with LTE systems. In the consideration of improving the peak rate, compatibility with the LTE systems and the utilization of the spectrum, a Carrier Aggregation (CA) technique is proposed in the LTE-A systems.

The CA technique refers to a scheme in which a User Equipment (UE) may aggregate multiple cells and the multiple cells may provide a data transmission service to the UE at the same time. In a CA system, carriers corresponding to the cells may be successive or not in the aspect of frequency. In order to be compatible with the LTE system, a maximum bandwidth of each component carrier is 20 MHz. Bandwidths of the component carriers may be the same or different.

In the CA system, cells in which the UE works are divided into a Primary Cell (PCell) and several Secondary Cells (SCells). The PCell is responsible for most control and signaling works (e.g., random access, transmission of uplink feedback to downlink data, report of Channel Quality Indicator (CQI), transmission of uplink pilot, etc.). The SCell mainly acts as resources to bear data transmissions.

2. Random Access Scheme in the LTE System

The random access in the LTE system includes a contention-free random access and a contention-based random access. The procedure of the contention-free random access is as shown in FIG. 1, which includes the following operations.

Msg (Message) 0: an eNB allocates for the UE a Random Access Preamble Index (ra-PreambleIndex) used for the contention-free random access and a Random Access Physical Random Access Channel (PRACH) Mask Index (ra-PRACH-MaskIndex) used for random access. For a contention-free random access initiated by arrival of downlink data, a Physical Downlink Control Channel (PDCCH) is used for carrying the above information. For a contention-free random access initiated by handover, a Radio Resource Control (RRC) signaling is used for carrying the above information.

Msg1: according to the ra-PreambleIndex and ra-PRACH-MaskIndex indicated in the Msg0, the UE transmits on the dedicated PRACH resource a designated dedicated preamble to the eNB. After receiving the Msg1, the eNB calculates an uplink Timing Advance (TA) value according to the Msg1.

Msg2: the eNB transmits a random access response Msg2 to the UE, wherein the random access response Msg2 carries timing advance information and UL grant resource allocated for subsequent uplink transmission. The timing advance is used for determining the timing relationship of a subsequent uplink transmission of the UE. The PDCCH carrying the Msg2 is scrambled by RA-Random Radio Network Temporary Identity (RA-RNTI). The RA-RNTI uniquely corresponds to a time-frequency resource in which the Msg1 is transmitted within a 10 ms window. In addition, the Msg2 also carries a preamble ID. The UE determines that the Msg2 is corresponding to the Msg1 transmitted by the UE according to the RA-RNTI and the preamble ID.

The procedure of the contention-based random access is as shown in FIG. 2, which includes the following operations.

Msg1: the UE selects a random access preamble and a PRACH resource, and transmits the selected random access preamble to the eNB using the PRACH resource.

Msg2: after receiving the preamble, the eNB calculates a timing advance (TA) value and transmits a random access response to the UE, wherein the random access response includes at least timing advance information and a UL grant for Msg3.

Msg3: the UE performs uplink transmission on the UL grant designated by the Msg2. For different random access reasons, the Msg3 transmits different contents in uplink. For example, for an initial access, the Msg3 transmits an RRC connection establishment request.

Msg4: a contention resolution message. The UE may determine whether the random access succeeds according to the Msg4.

The eNB may also use the Msg0 to initiate the contention-based random access. Different from the contention-free random access, the eNB indicates the UE to initiate the random access but does not indicate the detailed random access resource.

Based on the above procedure, the UE transmits uplink data and Hybrid Auto Repeat Request (HARQ) feedback information to downlink data according to requirements of the uplink timing advance. Thus, the eNB can receive the uplink transmission at a desired time point, which is referred to as uplink synchronization.

3. Multiple Timing Advance (Multi-TA) Scenarios Defined by CA

Due to the involvement of the CA, if frequency characteristics and transceiver distances of cells working on different carriers have a large difference, there may be different uplink timing advances for different carriers. Currently, 3GPP defines two scenarios supporting multi-TA. For example, FIG. 3 is a schematic diagram illustrating a scenario involving a Radio Remote Unit (RRU). For example, a large coverage (large circle) is provided by use of Frequency (F) 1, a Remote Radio Head (RRH) provides a hot spot coverage (small circle) by use of the F2 within the coverage of a F1 cell. Mobility managements are performed based on the F1. In this scenario, if the UE is located in an area overlapped by the F2 cell and the F1 cell, the F1 cell and the F2 cell may be aggregated. But the UL TAs of the F1 cell and the RRH cell are different.

FIG. 4 is a schematic diagram illustrating a scenario in which a repeater is involved. For example, the eNB supports the F1 and the F2, wherein the eNB provides a large coverage by use of the F1 (filled with left bias lines) and the eNB provides a small coverage by use of the F2 (filled with right bias lines). Through a frequency selective repeater, the coverage area of the F2 may be enlarged. In this scenario, if the UE is located in an overlapped area of an F1 cell and an F2 cell, the F1 cell and the F2 cell may be aggregated. But the UL TAs of the F1 cell and the F2 cell are different.

In conventional systems, in order to facilitate maintenance of the TAs of the Multi-TA system, a concept of a TA group is proposed. The UE in the cells belonging to the same TA group may use the same TA value for their UL Component Carriers (CCs). The UE in the cells belonging to different TA groups uses different TAs for their UL CCs. Within one TA group, the UE only needs to keep uplink synchronization with one cell to realize uplink synchronization with all cells in the TA group.

During the implementation of the present invention, the inventor finds that the conventional system has at least the following problems.

The current protocol supports only random access into the PCell. The random access procedure into the PCell is the same as that of a single cell in previous releases. If there are multiple TAs, the timing advance of the PCell may be different from those of other cells, the current random access procedure cannot meet the requirements of obtaining and maintenance of multiple uplink timing advances.

SUMMARY OF THE INVENTION

Examples of the present invention provide a random access method and apparatus based on multiple uplink timing advances, so as to ensure a random access procedure in a multi-TA scenario.

According to an example of the present invention, a random access method based on multiple uplink timing advances is provided. The method includes:

initiating, by a network side, for a user equipment a random access procedure in a secondary cell (SCell) on a designated carrier when acquiring that the user equipment has multiple uplink timing advances.

According to another example of the present invention, a random access method based on multiple uplink timing advances is provided. The method includes:

performing, by a user device, a random access procedure in a secondary cell on a designated carrier according to an indication of a network side if the user equipment has multiple uplink timing advances.

According to still another example of the present invention, a network side device is provided. The network side device includes:

a determining module, to acquire that a user equipment has multiple uplink timing advances; and a processing module, to initiate for a user equipment a random access procedure in a secondary cell (SCell) on a designated carrier when acquiring that the user equipment has multiple uplink timing advances.

According to still another example of the present invention, a user equipment is provided. The user equipment includes:

a determining module, to determine that the user equipment has multiple uplink timing advances; and a processing module, to perform a random access procedure in a secondary cell on a designated carrier according to an indication of a network side if the user equipment has multiple uplink timing advances.

Compared with conventional techniques, the present invention has at least the following advantages: the random access procedure in the SCell can be realized in scenarios that multi-TA is maintained.

DETAILED DESCRIPTION OF THE INVENTION

The present disclosure will be described in further detail hereinafter with reference to accompanying drawings and examples to make the technical solution therein clearer and complete. It is apparent that the following are merely some examples but not form all examples of the present disclosure. Based on the present disclosure, variations made by those with ordinary skill in the art without any inventive effort are within the scope of the present disclosure.

Example 1

The first embodiment of the present disclosure provides a random access method based on multiple uplink timing advances. For a CA scenario, if a UE has multiple uplink timing advances (Multi-TA), this example solves the problem that how the UE performs the random access into a SCell. The core idea includes: designating a carrier for each message during the random access procedure, performing the random access procedure according to the designated carrier by the network side and the UE, so as to implement the random access into the SCell. The messages during the random access procedure include: a random access resource allocation message Msg0, a random access preamble transmitting message Msg1, a random access response message Msg2, an uplink transmission message Msg3 scheduled by the random access, and a contention resolution message Msg4.

In particular, when acquiring that the UE has multiple uplink timing advances, the network side initiates for the UE a random access procedure of the SCell on a designated carrier. The UE performs the random access procedure of the SCell on the designated carrier according to the indication of the network side.

Figure 1:
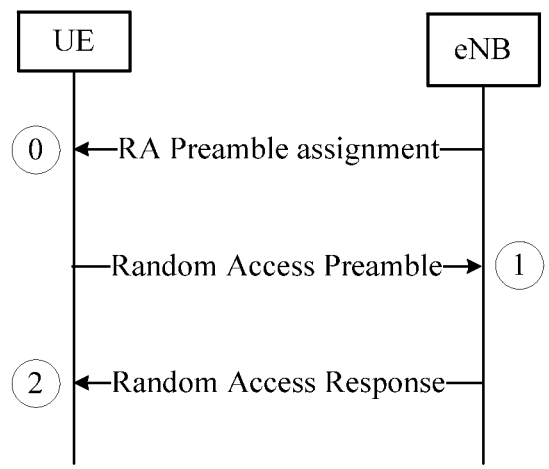
FIG. 1 is a schematic diagram illustrating a contention-free random access procedure in a conventional system.
Figure 2:
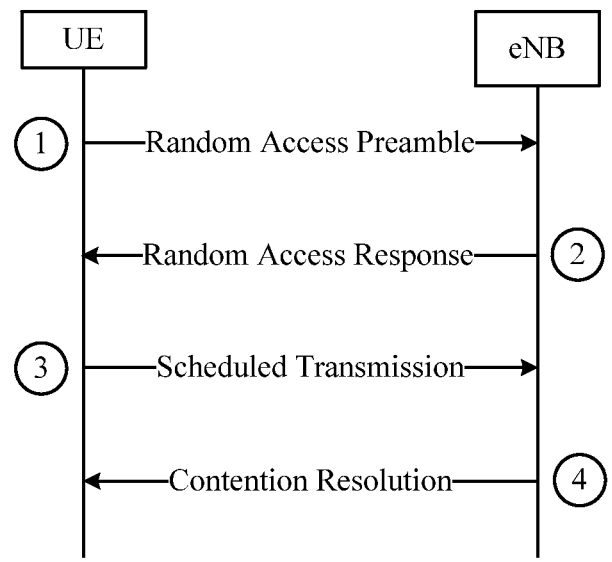
FIG. 2 is a schematic diagram illustrating a contention-based random access procedure in a conventional system.
Figure 3:
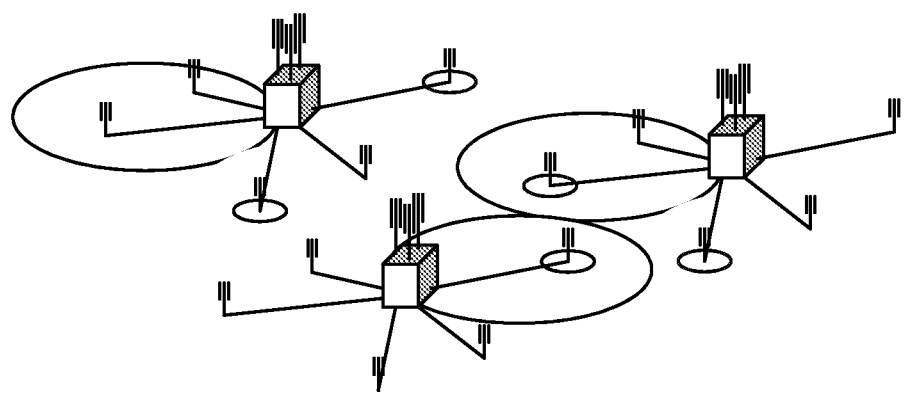
FIG. 3 is a schematic diagram illustrating a scenario in which a RRU is involved according to a conventional system.
Figure 4:
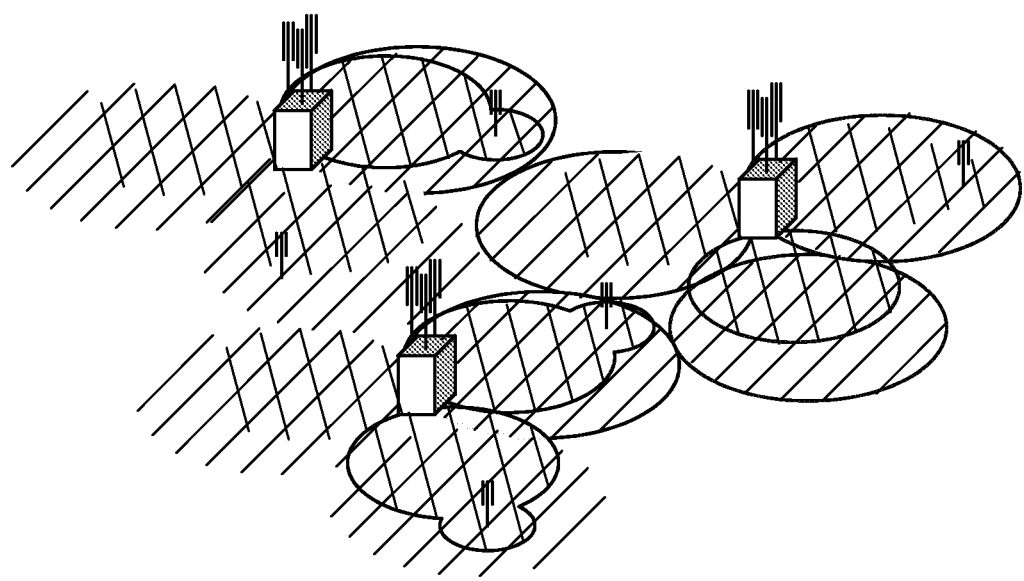
FIG. 4 is a schematic diagram illustrating a scenario in which a repeater is involved according to a conventional system.
Figure 5:
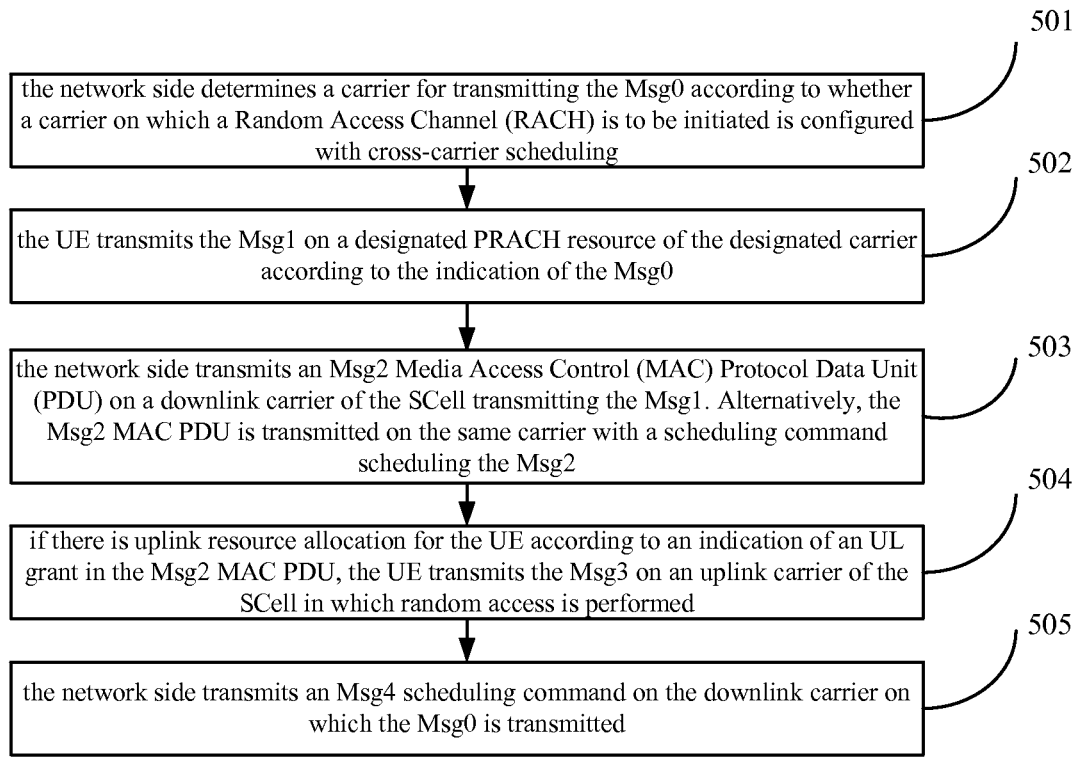
FIG. 5 is a flowchart illustrating a random access method based on multiple uplink timing advances according to a first example of the present invention.

For the Msg0-Msg4, as shown in FIG. 5, the random access method includes the following procedures.

At block 501, the network side determines a carrier for transmitting the Msg0 according to whether a carrier on which a Random Access Channel (RACH) is to be initiated is configured with cross-carrier scheduling. If the carrier on which the RACH is to be initiated is configured with the cross-carrier scheduling, the Msg0 is transmitted on a scheduling carrier configured. If the carrier on which RACH is to be initiated is not configured with the cross-carrier scheduling, the Msg0 is transmitted on a downlink carrier of a SCell in which the random access is to be initiated. Uplink and downlink carriers of the SCell are indicated by System Information Block 2 (SIB2). Relationship between the uplink and downlink carriers of the SCell is also referred to as an SIB2 linkage. Therefore, the downlink carrier is also referred to an SIB2 linkage downlink carrier that the UE transmits Msg1.

In examples of the present disclosure, the network side schedules the UE to initiate the RACH via a PDCCH command. Specifically, the carrier on which the random access is initiated is designated by the Msg0.

At block 502, the UE transmits the Msg1 on a designated PRACH resource of the designated carrier according to the indication of the Msg0, i.e., the UE transmits a designated preamble on the designated PRACH resource of the designated carrier according to the indication of the Msg0. In addition, if the Msg0 indicates a contention-based random access procedure, the UE selects a preamble randomly from preambles used for the contention-based random access to transmit the Msg1 on the PRACH resource configured on the current cell.

At block 503, the network side transmits an Msg2 Media Access Control (MAC) Protocol Data Unit (PDU) on a downlink carrier of the SCell transmitting the Msg1. Alternatively, the Msg2 MAC PDU is transmitted on the same carrier with a scheduling command scheduling the Msg2.

In examples of the present disclosure, the network side transmits the Msg2 scheduling command in the PCell; if the network side transmits the Msg2 MAC PDU on the same carrier with the scheduling command scheduling the Msg2, the Msg2 MAC PDU is located on the downlink carrier of the PCell. If the network side transmits the Msg2 MAC PDU on the downlink carrier of the SCell transmitting the Msg1, the Msg2 scheduling command indicates using a Carrier Indication Field (CIF) that the Msg2 MAC PDU is located on the downlink carrier of the SCell in which the random access is performed, alternatively, the Msg2 MAC PDU is located on the downlink carrier of the SCell in which the random access is performed in default.

A corresponding procedure at the UE side includes: the UE receiving the Msg2 scheduling command on the carrier on which the Msg0 is transmitted by the network side. The transmission of the Msg2 MAC PDU may be implemented through any one of following manners: the Msg2 MAC PDU is transmitted on the downlink carrier of the SCell transmitting the Msg1; and the Msg2 MAC PDU is transmitted on the same carrier with the Msg2 scheduling command, in the condition that the cross-carrier scheduling of the Msg2 is not supported.

In the example of the present disclosure, if the Msg2 MAC PDU and the scheduling command scheduling the Msg2 are transmitted on the same carrier, the UE receives the Msg2 scheduling command in the PCell and receives the Msg2 MAC PDU in the PCell. If the Msg2 MAC PDU is transmitted on the downlink carrier of the SCell transmitting the Msg1, the UE receives the Msg2 MAC PDU on the downlink carrier of the SCell in which the random access is performed according to indication of a (CIF) in the Msg2 scheduling command, or receives the Msg2 MAC PDU on the downlink carrier of the SCell in which random access is performed in default.

At block 504, if there is uplink resource allocation for the UE according to an indication of an UL grant in the Msg2 MAC PDU, the UE transmits the Msg3 on an uplink carrier of the SCell in which random access is performed and applies an uplink timing advance TA value in the Msg2. The downlink carrier of the PCell is taken as a reference downlink carrier of the TA value for TA value estimation. Or, the downlink carrier which belongs to the same SCell with the uplink carrier on which Msg1 is transmitted is taken as the reference downlink carrier of the TA value.

In embodiments of the present disclosure, in order to keep the format of the existing Msg2 MAC PDU unchanged, the uplink resource allocated in the Msg2 is the resource on the uplink carrier on which the Msg1 is transmitted in default.

At block 505, the network side transmits an Msg4 scheduling command on the downlink carrier on which the Msg0 is transmitted. In particular, if the Msg4 scheduling command schedules downlink transmission, an Msg4 MAC PDU is transmitted on a downlink carrier (e.g., the carrier on which the scheduling command is transmitted or a downlink carrier of the SCell in which random access is performed) indicated by the scheduling command. If the Msg4 scheduling command schedules uplink transmission, the uplink transmission is transmitted on an uplink carrier (e.g., the uplink carrier on which the Msg1 is transmitted) indicated by the Msg4 scheduling command.

A corresponding procedure at the UE side includes: the UE receiving the Msg4 scheduling command from the network side. If the Msg4 scheduling command schedules downlink transmission, the Msg4 MAC PDU is transmitted on the downlink carrier indicated by the Msg4 scheduling command. If the Msg4 scheduling command schedules uplink transmission, the UL grant indicated in the scheduling command is on the SCell in which the random access is initiated.

In examples of the present disclosure, the random access procedure in the SCell may be realized in scenarios in which maintenance of the multi-TA is ensured.

In the following examples, if the Msg1 is cross-carrier scheduled by the Msg0, descriptions are given taking the PCell as an example scheduling carrier for scheduling the uplink carrier of the SCell in which Msg1 is transmitted. If the SCell 2 is cross-scheduled by the SCell 1 for the random access, the procedure is similar.

Example 2

The second example of the present disclosure provides a random access method based on multiple uplink timing advances. The PCell initiates a contention-free random access procedure in a designated SCell. The processing at the eNB side includes the following.

At block 1, the eNB transmits a scheduling command on a PDCCH of the PCell to indicate the designated SCell to transmit an Msg1 through a CIF in Downlink Control Information (DCI) of the PDCCH. PRACH resource location and a preamble to be used by the UE for transmitting Msg1 are also designated in the PDCCH.

At block 2, the eNB receives the designated preamble on the designated PRACH resource location of the SCell and performs an estimation of a TA value.

At block 3, the eNB transmits an Msg2 scheduling command in the PCell. An Msg2 MAC PDU is located on the downlink carrier of the PCell. Or, the Msg2 MAC PDU is located on the downlink carrier of the SCell in which the random access is performed, wherein the downlink carrier of the SCell is indicated by the Msg2 scheduling command using the CIF. Or, the Msg2 MAC PDU is located on the downlink carrier of the SCell in which the random access is performed in default, wherein the Msg2 scheduling command does not include the CIF.

In particular, the Msg2 is used for notifying the UE the uplink timing advance of the SCell. The uplink resource allocation for the UE in the Msg2 MAC PDU does not include the CIF. The uplink resource is located on the carrier on which the Msg1 is transmitted in default.

Processing at the UE side includes the following procedures.

At block A, the UE receives the scheduling command on the PDCCH of the PCell, and obtains the CIF, the PRACH resource and the preamble for transmitting the Msg1.

At block B, the UE transmits the designated preamble on the designated PRACH resource of the designated carrier.

At block C, the UE receives the Msg2 scheduling command in the PCell, and receives the Msg2 MAC PDU in the PCell. Or, the UE receives the Msg2 MAC PDU on the downlink carrier of the SCell in which the random access is performed according to the CIF in the Msg2 scheduling command. Or, the UE receives the Msg2 MAC PDU on the downlink carrier of the SCell in which the random access is performed in default, wherein the Msg2 scheduling command does not include the CIF.

At block D, if there is uplink resource allocated for the UE according to the UL grant in the Msg2 MAC PDU, the UE transmits the Msg3 on the uplink carrier of the SCell in which random access is performed and applies the TA value indicated by the Msg2. The downlink carrier of the PCell is taken as a reference downlink carrier for TA value estimation. Or, the downlink carrier belonging to the same SCell with the uplink carrier transmitting the Msg1 (SIB2 of this cell will designate relationships between uplink and downlink carriers, also referred to as a SIB2 linkage) is taken as the reference downlink carrier.

Example 3

The third example of the present disclosure provides a random access method based on multiple uplink timing advances, in which the PCell initiates a contention-based random access procedure in a designated SCell. The processing at the eNB side includes the following procedures.

At block 1, the eNB transmits a scheduling command on a PDCCH of the PCell and indicates the designated SCell to transmit the Msg1 through the CIF in the DCI on the PDCCH. The UE is indicated to perform a contention-based random access in the scheduling command on the PDCCH, i.e., no PRACH resource and a preamble will be allocated.

At block 2, the eNB receives the Msg1 transmitted by the UE in the SCell. Since the resource location is not determined, the eNB needs to monitor the Msg1 continuously. The eNB estimates the TA value according to the receiving location of the Msg1.

At block 3, the eNB transmits an Msg2 scheduling command in the PCell. An Msg2 MAC PDU is located on a downlink carrier of the PCell. Or, the Msg2 MAC PDU is located on the downlink carrier of the SCell in which the random access is performed, wherein the downlink carrier is indicated by the Msg2 scheduling command using the CIF. Or, the Msg2 MAC PDU is located on the downlink carrier of the SCell in which the random access is performed in default, wherein the Msg2 scheduling command does not include the CIF.

In particular, the Msg2 is used for notifying the UE the uplink timing advance of the SCell. The uplink resource allocation for the UE in the Msg2 MAC PDU does not include the CIF. The uplink resource is located on the carrier on which the Msg1 is transmitted in default.

At block 4, the eNB receives an Msg3 on the uplink resource allocated in the Msg2, and performs a contention solution according to uplink transmission contents in the Msg3 to determine that the random access is performed by which UE.

At block 5, the eNB schedules an Msg4 in the PCell to perform the contention resolution. If an Msg4 scheduling command schedules downlink transmission, an Msg4 MAC PDU is located in the PCell or the downlink carrier of the SCell in which random access is performed. If the Msg4 scheduling command schedules uplink transmission, the UL grant in the Msg4 scheduling command is located on the uplink carrier of the SCell in which random access is performed.

Processing at the UE side includes the following.

At block A, the UE receives the scheduling command on the PDCCH of the PCell, parses the CIF to obtain the SCell on which the Msg1 is to be transmitted, and determines to perform a contention-based random access.

At block B, the UE selects a PRACH resource and a preamble from a set of the PRACH resources and preambles configured for the SCell to transmit the Msg1.

At block C, if the UE receives the Msg2 scheduling command in the PCell, the UE receives the Msg2 MAC PDU in the PCell. Or, the UE receives the Msg2 MAC PDU on the downlink carrier of the SCell in which random access is performed according to the CIF in the Msg2 scheduling command. Or, the UE receives the Msg2 MAC PDU on the downlink carrier of the SCell in which random access is performed in default, wherein the Msg2 scheduling command does not include the CIF indication.

At block D, the UE applies the TA value in the Msg2, and transmits uplink transmission (i.e., the Msg3) on the uplink carrier of the SCell in which random access is performed in accordance with the UL grant in the Msg2 MAC PDU.

At block E, the UE receives the Msg4 scheduling command from the eNB. If the Msg4 scheduling command schedules downlink transmission, the Msg4 MAC PDU is on the downlink carrier (the downlink carrier of the PCell, or the downlink carrier of the SCell in which random access is performed) corresponding to the scheduling command. If the Msg4 scheduling command schedules uplink transmission, the UL grant indicated in the scheduling command on the PDCCH is in the SCell in which random access is initiated. The UE finishes the contention-based random access.

Example 4

The fourth example of the present disclosure provides a random access method based on multiple uplink timing advances. If the contention-free random access is initiated within a SCell (the network side configures that the SCell can be scheduled only by the SCell itself, there is no cross-carrier scheduling), processing at the eNB side includes the following procedures.

At block 1, the eNB transmits a scheduling command on a PDCCH of a downlink carrier of a designated SCell to allocate PRACH resource and a preamble for transmitting an Msg1. If the SCell is deactivated, it is required to activate the SCell through a MAC Control Element (CE).

At block 2, the eNB receives the allocated preamble on the allocated PRACH resource of the uplink carrier of the SCell, and estimates a TA value according to the Msg1 received.

At block 3, the eNB transmits an Msg2 on the downlink carrier of the SCell, wherein the Msg2 includes the estimated TA value and uplink resource allocated for subsequent uplink transmission.

The processing at a UE side includes the following.

At block A, the UE receives the scheduling command on the PDCCH of the downlink carrier of the designated SCell, parses the scheduling command to obtain the PRACH resource and the preamble for transmitting the Msg1.

At block B, the UE transmits the allocated preamble on the allocated PRACH resource of the uplink carrier of the SCell.

At block C, the UE receives the Msg2 on the downlink carrier of the SCell.

Example 5

The fifth example of the present disclosure provides a random access method based on multiple uplink timing advances. If a contention-based random access is initiated within a SCell (the network side configures that the SCell can be scheduled only by the SCell itself, there is no cross-carrier scheduling), in the processing at an eNB side and a UE side, the processing of the Msg0, the Msg1 and the Msg2 is similar to that in the fourth example. The processing of the Msg3 and the Msg4 is similar to that in the prior art. Therefore, the processing is not repeated herein.

Example 6

Figure 6:
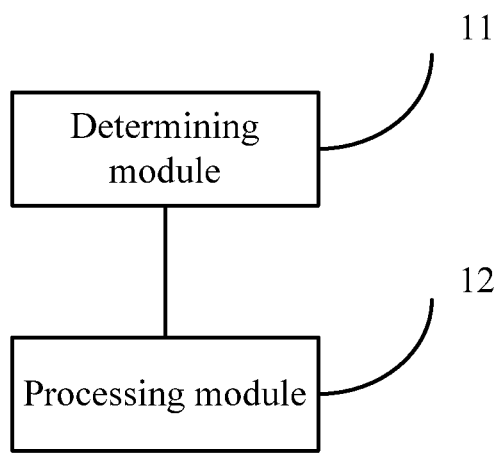
FIG. 6 is a schematic diagram illustrating a structure of a network side device according to a sixth example of the present invention.

Based on a similar idea of the above method, an example of the present disclosure further provides a network side device, as shown in FIG. 6. The network side device includes:

a determining module 11, to acquire that a UE has multiple uplink timing advances;

a processing module 12, to initiate for a user equipment a random access procedure in a secondary cell (SCell) on a designated carrier when acquiring that the user equipment has multiple uplink timing advances.

The processing module 12 is to determine a carrier for transmitting a random access resource allocation message Msg0 according to whether a cross-carrier scheduling is configured for the carrier on which a Random Access Channel (RACH) is to be initiated.

The processing module 12 is further to transmit the Msg0 on a scheduling carrier configured if the cross-carrier scheduling is configured for the carrier on which the RACH is to be initiated, transmit the Msg0 on a downlink carrier of an SCell in which random access is initiated if the cross-carrier scheduling is not configured for the carrier on which the RACH is to be initiated.

The processing module 12 is to transmit a random access response message (Msg2) Media Access Control (MAC) Protocol Data Unit (PDU) on a downlink carrier of an SCell on which a random access preamble transmitting message Msg1 is transmitted, or to transmit an Msg2 MAC PDU on a same carrier with a Msg2 scheduling command.

If the Msg2 scheduling command is transmitted in the PCell and the Msg2 MAC PDU is transmitted on the same carrier with the scheduling command scheduling the Msg2, the MSg2 MAC PDU is located on the downlink carrier of the PCell; if the Msg2 MAC PDU is transmitted on the downlink carrier of the SCell transmitting the Msg1, the Msg2 MAC PDU is located on the downlink carrier of the SCell in which the random access is performed in default or indicated by a Carrier Indication Field (CIF) in the Msg2 scheduling command.

The processing module 12 is to transmit a contention resolution message Msg4 scheduling command on the downlink carrier on which the Msg0 is transmitted.

If the Msg4 scheduling command schedules downlink transmission, an Msg4 MAC PDU is transmitted on the uplink carrier indicated by the scheduling command.

If the Msg4 scheduling command schedules uplink transmission, uplink transmission is performed on the downlink carrier indicated by the scheduling command.

The modules of the apparatus provided by the examples of the present disclosure may be integrated into one module or may be disposed separately. The above modules may be combined into one module or may be further divided into multiple sub-modules.

Example 7

Figure 7:
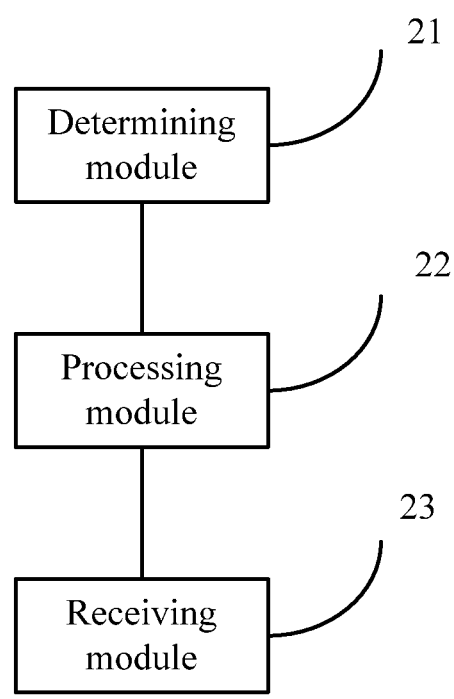
FIG. 7 is a schematic diagram illustrating a structure of a user equipment according to a seventh example of the present invention.

Based on the same idea of the above method, an example of the present disclosure further provides a user equipment, as shown in FIG. 7, the user equipment includes:

a determining module 21, to determine that determine that the user equipment has multiple uplink timing advances; and a processing module 22, to perform a random access procedure in a secondary cell on a designated carrier according to an indication of a network side if the user equipment has multiple uplink timing advances.

In particular, the processing module 22 is to transmit a random access preamble transmitting message Msg1 on a Packet Random Access Channel (PRACH) resource on the current cell according to an indication of a random access resource allocation message Msg0.

The processing module 22 is further to select randomly from preambles used for contention-based random access to transmit the Msg1 on PRACH resources configured on a current cell if the Msg0 indicates a contention-based random access procedure.

if a random access response message Msg2 scheduling command is received from the carrier on which the network side transmits Msg0, an Msg2 MAC PDU is transmitted on a downlink carrier of an SCell on which the Msg1 is transmitted, or an Msg2 MAC PDU is transmitted on the same carrier with the Msg2 scheduling command.

The user equipment further includes a receiving module 23, to receive the Msg2 scheduling command in an Primary Cell (PCell) and receive the Msg2 MAC PDU in the PCell, if the Msg2 MAC PDU is transmitted on the same carrier with the Msg2 scheduling command, or receive the Msg2 MAC PDU on the downlink carrier of the SCell in which random access is performed according to the indication of a Carrier Indication Field (CIF) in the Msg2 scheduling command or in default if the Msg2 MAC PDU is transmitted on the downlink carrier of the SCell on which the Msg1 is transmitted.

The processing module 22 is to transmit an uplink transmission message Msg3 scheduled by random access on the uplink carrier of the SCell in which random access is performed according to an UL grant in the Msg2 MAC PDU and applies an uplink timing advance (TA) value in the Msg2 if there is uplink resource allocation for the user equipment.

The TA value takes the downlink carrier of the PCell as a reference downlink carrier for TA value estimation, or takes the downlink carrier which belongs to the same SCell with the uplink carrier on which the Msg1 is transmitted as the reference downlink carrier The receiving module 23 is to receive a contention resolution message Msg4 scheduling command from the network side, wherein an Msg4 MAC PDU is transmitted on a downlink carrier indicated by the scheduling command if the Msg4 scheduling command schedules downlink transmission, an UL grant indicated in the scheduling command is in an SCell in which random access is performed if the Msg4 scheduling command schedules uplink transmission.

The modules of the apparatus provided by the examples of the present disclosure may be integrated into one module or may be disposed separately. The above modules may be combined into one module or may be further divided into multiple sub-modules.

Through the above descriptions of the above examples, it will be apparent for those with ordinary skill in the art that the above examples may be implemented by software and necessary general hardware platform, or through hardware, but the former is better in most cases. Based on the above, the technical solution of the present invention or the contribution part of the present invention may be implemented in the form of a software product. The computer software product is stored in a storage medium and comprises a plurality of instructions for making a computer device (which may be a personal computer, a server or a network device etc.) implement the method recited in the examples of the present disclosure.

It will be apparent for those with ordinary skill in the art that drawings of the present invention are merely figures accompanying some examples. Not all of the modules and procedures in the figures are necessary to implement the present invention.

Those with ordinary skill in the art will understand that the modules in the apparatuses of the present invention may be disposed in the apparatuses provided by the examples of the present invention, or may be disposed in one or more apparatuses provided by the examples of the present invention after some variations. The above modules may be combined into one module or divided into multiple sub-modules.

The serial numbers of the examples of the present invention are merely used for description but not denoting preference of the examples.

What has been described and illustrated herein is a preferred example of the disclosure along with some of its variations. The terms, descriptions and figures used herein are set forth by way of illustration only and are not meant as limitations. Many variations are possible within the spirit and scope of the disclosure, which is intended to be defined by the following claims and their equivalents in which all terms are meant in their broadest reasonable sense unless otherwise indicated.

What is claimed is:

1. A method for performing random access based on multiple uplink timing advances, comprising:
    in response to acquiring that a user equipment (UE) has multiple uplink timing advances, initiating, by a network side, a random access on a designated carrier of a secondary cell (SCell) for the UE;
    wherein initiating the random access on the designated carrier of the SCell for the UE comprises:
    determining, by the network side, a carrier for transmitting a random access resource allocation message Msg0 according to whether cross-carrier scheduling is configured for the designated carrier on which the random access is to be initiated;
    transmitting, by the network side, the random access resource allocation message Msg0 on a scheduling carrier configured in response to determining that cross-carrier scheduling is configured for a designated carrier on which a random access of a secondary cell (SCell) is to be initiated for a user equipment (UE); and
    transmitting, by the network side, the Msg0 on a downlink carrier of the SCell in which the random access is to be initiated in response to determining that the cross-carrier scheduling is not configured for the designated carrier on which the random access is to be initiated; and
    wherein initiating the random access on the designated carrier of the SCell for the UE further comprises:
    transmitting, by the network side, a random access response message (Msg2) Media Access Control (MAC) Protocol Data Unit (PDU) on the downlink carrier of the SCell in which the random access is initiated; or
    transmitting, by the network side, an Msg2 MAC PDU on the same carrier as a Msg2 scheduling command.

2. The method of claim 1, wherein transmitting the Msg2 MAC PDU on the same carrier as the Msg2 scheduling command comprises:
    transmitting, by the network side, the Msg2 scheduling command in a Primary Cell (PCell); and
    transmitting, by the network side, the Msg2 MAC PDU on a downlink carrier of the PCell;
    wherein transmitting the Msg2 MAC PDU on the downlink carrier of the SCell in which the random access is initiated comprises:
    transmitting, by the network side, the Msg2 MAC PDU on the downlink carrier of the SCell in which the random access is initiated in default or indicated by a Carrier Indication Field (CIF) in the Msg2 scheduling command.

3. A method for performing random access based on multiple uplink timing advances, comprising:
    in response to a user equipment (UE) having multiple uplink timing advances, receiving, by the UE, a random access resource allocation message Msg0 on a scheduling carrier configured in response to cross-carrier scheduling being configured for the designated carrier on which the random access is to be initiated for the UE;
    receiving, by the UE, the Msg0 on a downlink carrier of the SCell in which the random access is to be initiated in response to the cross-carrier scheduling being not configured for the designated carrier on which the random access is to be initiated; and
    transmitting, by the UE, a random access preamble transmitting message Msg1 on a Physical Random Access Channel (PRACH) resource of the designated carrier according to an indication of the Msg0;
    wherein performing the random access on the designated carrier of the SCell according to the indication of the network side comprises:
    receiving, by the UE, a random access response message Msg2 scheduling command on a carrier on which the network side transmits the Msg0, wherein an Msg2 MAC PDU is transmitted on a downlink carrier of the SCell on which the random access is performed, or an Msg2 MAC PDU is transmitted on the same carrier as the Msg2 scheduling command;

wherein in response to receiving the random access response message Msg2 scheduling command from the carrier on which the network side transmits the Msg0, the Msg2 MAC PDU is transmitted on the downlink carrier of the SCell on which the random access is performed, or the Msg2 MAC PDU is transmitted on the same carrier as the Msg2 scheduling command.

4. The method of claim 3, further comprising:
selecting randomly, by the UE, from preambles used for a contention-based random access to transmit the Msg1 on a PRACH resource configured on the SCell if the Msg0 indicates the contention-based random access.

5. The method of claim 3, wherein receiving the Msg2 scheduling command on the carrier on which the network side transmits Msg0 comprises:
receiving, by the UE, the Msg2 scheduling command in a Primary Cell (PCell) and receiving the Msg2 MAC PDU in the PCell if the Msg2 MAC PDU is transmitted on the same carrier as the Msg2 scheduling command;
receiving, by the UE, the Msg2 MAC PDU on the downlink carrier of the SCell in which the random access is performed according to a Carrier Indication Field (CIF) in the Msg2 scheduling command or in default if the Msg2 MAC PDU is transmitted on the downlink carrier of the SCell on which the random access is performed if the Msg2 MAC PDU is transmitted on the downlink carrier of the SCell on which the Msg1 is transmitted.

6. The method of claim 3, wherein performing the random access on the designated carrier of the SCell according to the indication of the network side comprises:
transmitting, by the UE, an uplink transmission message Msg3 scheduled by the random access on an uplink carrier of the SCell in which random access is performed according to an UL grant in the Msg2 MAC PDU and applying an uplink timing advance (TA) value in the Msg2 if there is uplink resource allocation for the UE.

7. The method of claim 6, wherein the TA value takes a downlink carrier of the PCell as a reference downlink carrier for TA value estimation, or takes the downlink carrier which belongs to the same SCell as the uplink carrier in which the random access is performed as the reference downlink carrier.

8. A network side device comprising:
a processor for executing instructions stored in a non-transitory machine readable storage medium to execute:
in response to acquiring that a user equipment (UE) has multiple uplink timing advances, initiating, by a network side, a random access on a designated carrier of a secondary cell (SCell) for the UE;
wherein initiating the random access on the designated carrier of the SCell for the UE comprises:
determining, by the network side, a carrier for transmitting a random access resource allocation message Msg0 according to whether cross-carrier scheduling is configured for the designated carrier on which the random access is to be initiated; and
transmitting the random access resource allocation message Msg0 on a scheduling carrier configured in response to determining that cross-carrier scheduling is configured for a designated carrier on which a random access of a secondary cell (SCell) is to be initiated for a user equipment (UE), transmitting the Msg0 on a downlink carrier of the SCell in which the random access is to be initiated in response to determining that the cross-carrier scheduling is not configured for the designated carrier on which the random access is to be initiated; and
initiating the random access on the designated carrier of the SCell for the UE further comprises:
transmitting a random access response message (Msg2) Media Access Control (MAC) Protocol Data Unit (PDU) on the downlink carrier of the SCell on which the random access is initiated, or transmitting an Msg2 MAC PDU on the same carrier as a Msg2 scheduling command.

9. A user equipment (UE), comprising:
a processor for executing instructions stored in a non-transitory machine readable storage medium to execute the following procedure, comprising:
determine that a UE has multiple uplink timing advances; and
receive a random access resource allocation message Msg0 on a scheduling carrier configured in response to cross-carrier scheduling being configured for the designated carrier on which the random access is to be initiated for the UE, receive the Msg0 on a downlink carrier of the SCell in which the random access is to be initiated in response to the cross-carrier scheduling being not configured for the designated carrier on which the random access is to be initiated, transmit a random access preamble transmitting message Msg1 on a Physical Random Access Channel (PRACH) resource of the designated carrier according to an indication of the Msg0;
wherein performing the random access on the designated carrier of the SCell according to the indication of the network side comprises:
receiving, by the UE, a random access response message Msg2 scheduling command on a carrier on which the network side transmits the Msg0, wherein an Msg2 MAC PDU is transmitted on a downlink carrier of the SCell on which the random access is performed, or an Msg2 MAC PDU is transmitted on the same carrier as the Msg2 scheduling command; and
wherein in response to receiving the random access response message Msg2 scheduling command from the carrier on which the network side transmits the Msg0, the Msg2 MAC PDU is transmitted on the downlink carrier of the SCell on which the random access is performed, or the Msg2 MAC PDU is transmitted on the same carrier as the Msg2 scheduling command.

10. The UE of claim 9, wherein the instructions are further to execute the following procedure:
select randomly from preambles used for a contention-based random access to transmit the Msg1 on PRACH resources configured on the SCell if the Msg0 indicates the contention-based random access.

11. The UE of claim 9, wherein if a random access response message Msg2 scheduling command is received from the carrier on which the network side transmits Msg0; a Msg2 MAC PDU is transmitted on a downlink carrier of the SCell on which the random access is performed, or an Msg2 MAC PDU is transmitted on the same carrier as the Msg2 scheduling command.

* * * * *